United States Patent
Vuceta

[11] 4,006,608
[45] Feb. 8, 1977

[54] TORQUE RELEASE DRIVE COUPLING

[75] Inventor: Ivan N. Vuceta, San Gabriel, Calif.

[73] Assignee: Consolidated Devices, Inc., City of Industry, Calif.

[22] Filed: Nov. 3, 1975

[21] Appl. No.: 628,393

[52] U.S. Cl. .................................. 64/29; 192/56 R
[51] Int. Cl.$^2$ ............................................. F16D 3/56
[58] Field of Search ............ 64/29; 192/56; 81/52.4

[56] References Cited

UNITED STATES PATENTS

| | | | |
|---|---|---|---|
| 3,080,029 | 3/1963 | Stober | 64/29 |
| 3,185,275 | 5/1965 | Orwin | 64/29 |
| 3,491,839 | 1/1970 | McIntire | 64/29 |
| 3,722,644 | 3/1973 | Steinhagen | 64/29 |

FOREIGN PATENTS OR APPLICATIONS

| 846,352 | 8/1957 | United Kingdom | 64/29 |
|---|---|---|---|

*Primary Examiner*—Samuel Scott
*Assistant Examiner*—Randall Heald
*Attorney, Agent, or Firm*—Georges A. Maxwell

[57] ABSTRACT

A torque limiting device engageable with and between a rotating power shaft and piece of work to be torqued, including a drive section connected with the power shaft and having a plurality of circumferentially spaced sockets, a driven plate with through openings normally registering with said sockets, drive balls normally engaged in and extending between the said openings and sockets, an elongate torque shaft with one end coupled with the plate and its other end connected with said work, a keeper plate overlaying the said openings in the driven plate to hold the balls engaged in said openings and sockets and having pockets normally circumferentially offset from said openings, a body, means connecting the body in predetermined rotative position with the torque shaft, spring means normally yieldingly maintaining the keeper plate in normal rotative position relative with the body, said pockets being circumferentially offset from said openings a distance equal to the circumferential deflection of the torque shaft upon the conducting of predetermined torque therethrough, said balls moving through the openings, from engagement in the sockets and into engagement in the pockets when said torque is applied and thereby breaking drive between the driven and keeper plates.

7 Claims, 10 Drawing Figures

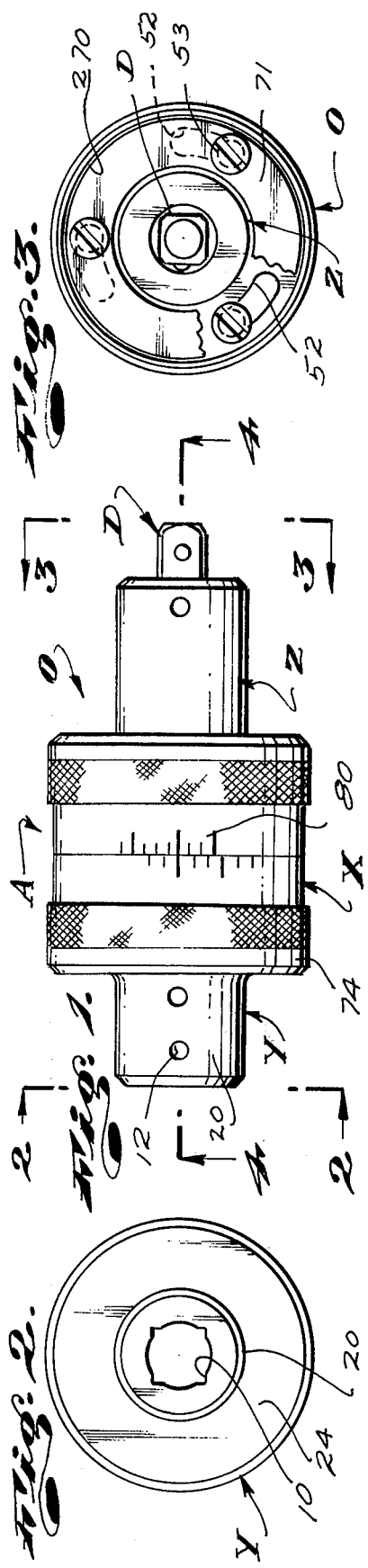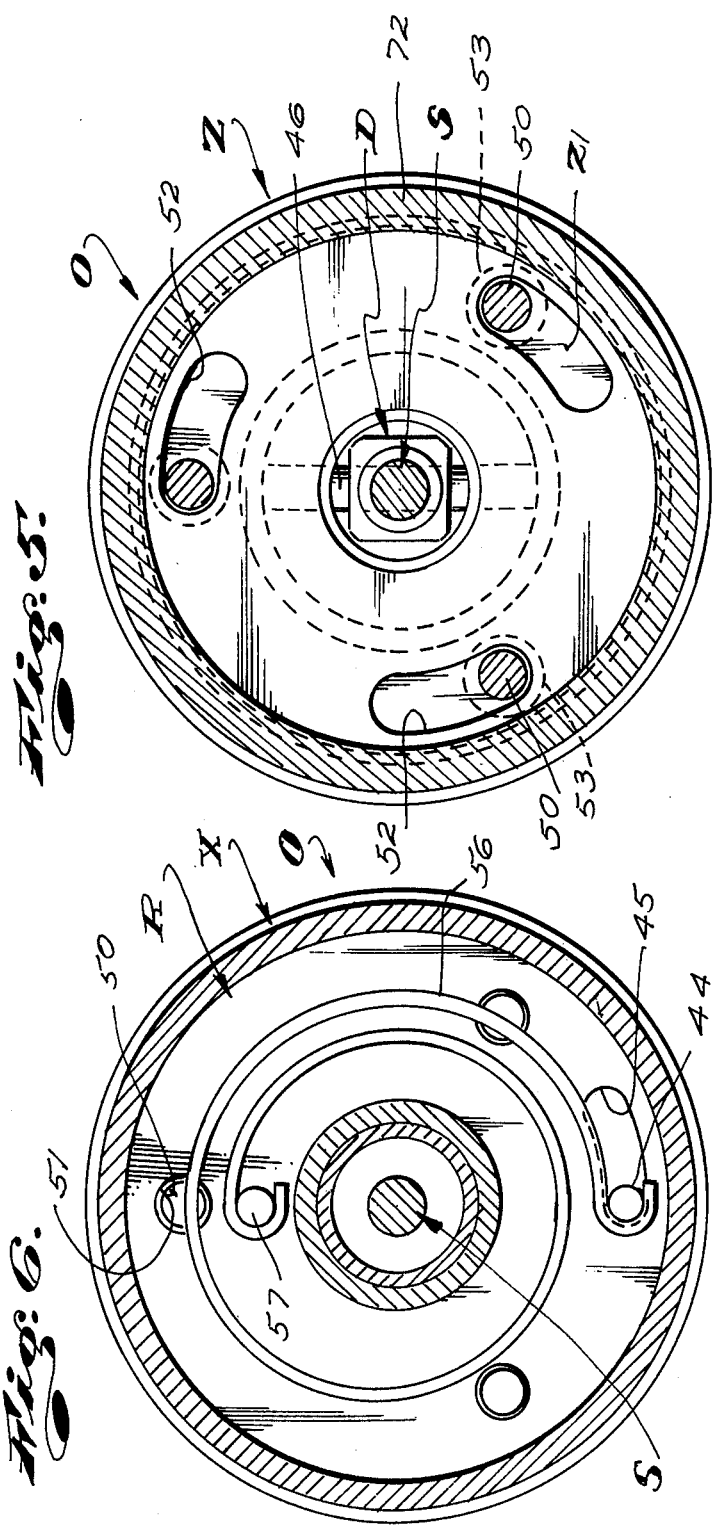

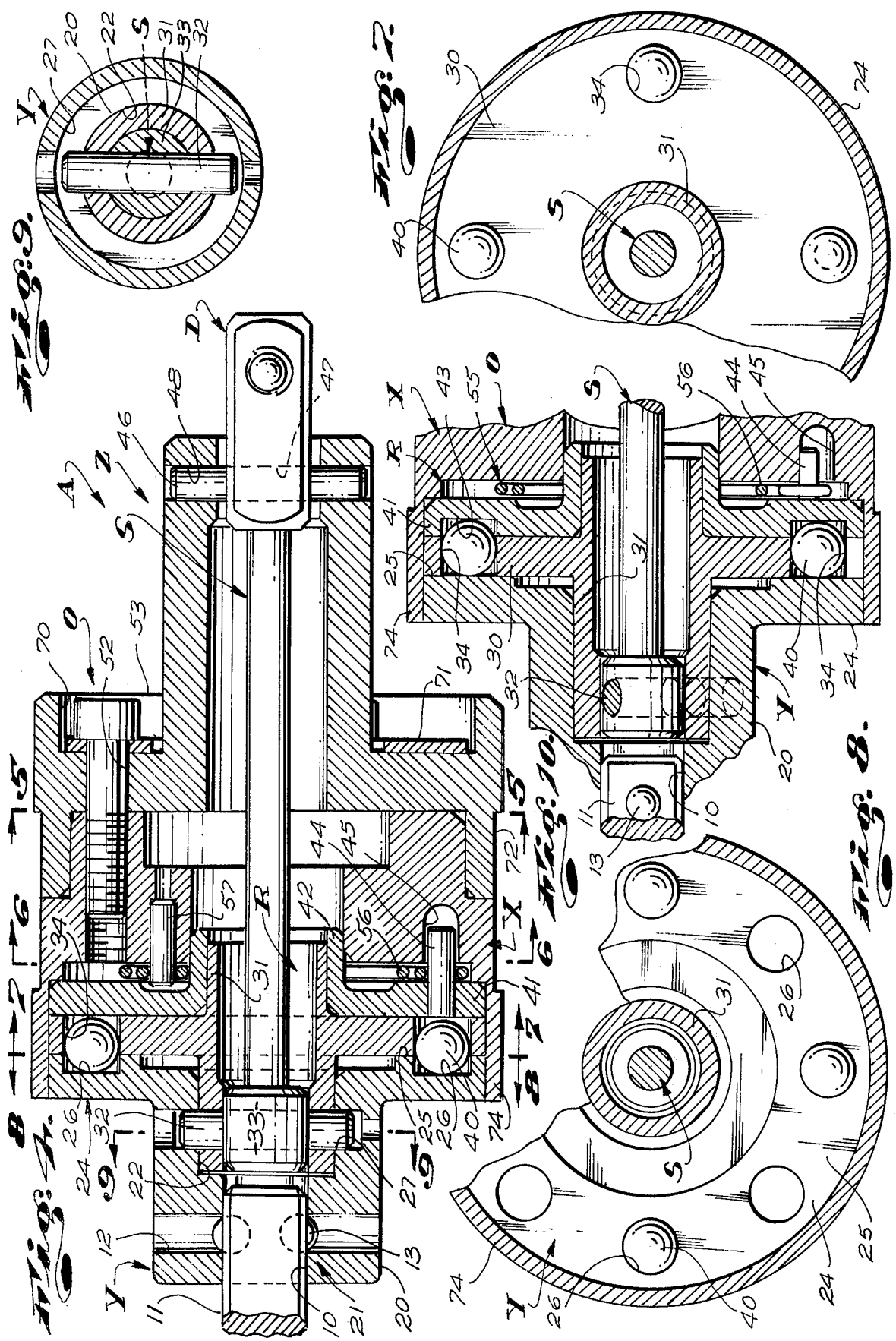

TORQUE RELEASE DRIVE COUPLING

This invention has to do with a torque limiting device for power driven screw driving tools and the like.

Throughout the industrial arts where screw fasteners are employed, it is common practice to provide and to use power tools to drive or advance the fasteners into position in related work and to set the fasteners at predetermined torque. The power tools employed are most frequently hand tools with manually engageable housings in which drive means or prime movers, such as electric motors, are arranged and from which output or drive shafts project. The tools are frequently provided with pistol grip type handles and suitable on and off triggers or switches. Such tools are most commonly pneumatic tools, though both electric and hydraulic tools are not uncommon.

In order to limit and/or control the torque applied by and through power tools of the character referred to above, a form of spring loaded releasable latch or ratchet means is provided between the output shaft and the drive means and which is such that when the desired predetermined, set torsional force is exerted by the shaft onto a related fastener or the like, driving connection between the drive means and the shaft is interrupted or broken.

A most common functional characteristic of such tools is the repetitious intermittent engaging and disengaging of the drive between the drive means and the shaft, when desired torque on the fastener or work has been reached and which continues until the drive means is de-energized.

The above intermittent engaging and disengaging of the drive means and shafts results in delivery of impact forces through the shafts and onto the work and has given rise to identifying or naming such tool, "impact tools" or "impact drivers." Another common name for such tools is "nut runners."

A principal shortcoming to be found in the use of the above noted power drivers or impact tools resides in the fact that once a desired torque is reached, the subsequent application of repeated impact forces increases the torque applied to the work and frequently results in over torquing of the work. The amount of torque added to the work by the above noted impacting is cumulative and is such that it cannot be effectively controlled within any but the greatest of tolerances.

As a general rule, efforts are made to determine the amount of accumulated torque that can be expected when a fastener worked upon by a particular power driver tool is subjected to, for example, from 5 to 10 rapidly applied impacts by the tool. The tool is then set to release at a torque which is less than the desired or sought after torque by a force equal to the anticipated accumulated force of the first 6 or 7 applied impacts and the worker or user of the tool is given instructions to advance all fasteners until the tool used releases and to thereafter let the tool impact upon a fastener from 5 to 10 times.

It is believed abundantly clear that the tools and procedures noted above, while having proved to be a great aid in the industrial arts, are only suitable for use in situations where wide or great tolerances are permitted and that they are not suitable for and cannot be used in those ever-increasing number of situations where tolerances, as regards applied torsional forces, must be accurately limited and controlled.

An object and feature of my invention is to provide a torque limiting device for power driven screw fastener driving tools and the like, which means is such that applied torque can be effectively and accurately controlled within small or limited tolerances.

It is an object and feature of my invention to provide a device of the character referred to that can be easily and advantageously engaged with and between the drive shaft of a hand held electric, pneumatic or hydraulic power tool and a work engaging head in the form of a screw-driver head, a nut driving socket, or the like.

Still another object and feature of my invention is to provide a device of the character referred to which is such that rotary drive is maintained between the power tool drive shaft and the work engaging head related to it and which interrupts rotary drive and establishes substantially free wheeling between the shaft and the head as soon as the fastener is set at or under predetermined torque.

It is an object and feature of my invention to provide a device of the character referred to which is such that it can be easily, quickly and accurately set to apply any desired torque through a related work engaging head and onto a piece of work, within a wide range of forces.

Yet another object and feature of the present invention is to provide a device of the character referred to which is rugged and durable, a device which has a long and dependable life expectancy and which is easy, practical and economical to manufacture, use and maintain.

While my invention is suitable for use in combination with power tools having rotary output shafts, it is equally adaptable and suitable for static use, where it is related to manually operated or powered torque applying tools or elements (such as screwdrivers) through which rotary or turning forces are applied to effect yielding movement and/or advancing of the structural assembly involved and/or worked upon.

A special object and feature of my invention is to provide a torque limiting device of the character referred to in the foregoing which is in the nature and form of an adapter that can be advantageously related with electric hand drills, appropriate elements or parts of manually operable torquing tools, such as socket wrenches and the like, whereby such common tools are afforded torque limiting capabilities.

The foregoing and other objects and features of the present invention will be apparent and will be fully understood from the following detailed description of a typical preferred form and embodiment of the invention, throughout which description reference is made to the accompanying drawings, in which:

FIG. 1 is a side elevational view of my screw torque limiting device;

FIG. 2 is an end view, taken substantially as indicated by line 2—2 on FIG. 1;

FIG. 3 is an end view, taken substantially as indicated by line 3 on FIG. 1;

FIG. 4 is an enlarged detailed longitudinal sectional view, taken as indicated by line 4—4 on FIG. 1;

FIG. 5 is a transverse sectional view, taken substantially as indicated by line 5—5 on FIG. 4;

FIG. 6 is a transverse sectional view, taken substantially as indicated by line 6—6 on FIG. 4;

FIG. 7 is a transverse sectional view, with portions removed, taken substantially as indicated by line 7—7 on FIG. 4;

FIG. 8 is a transverse sectional view, with portions removed, taken substantially as indicated by line 8—8 on FIG. 4;

FIG. 9 is a transverse sectional view, taken substantially as indicated by line 9—9 on FIG. 4; and FIG. 10 is an enlarged detailed sectional view of a portion of the structure shown on FIG. 4 of the drawings and showing parts in another position.

Referring to FIGS. 1, 2 and 3 of the drawings, the device A that I provide is shown as a simple, neat, compact, cylindrical unit with a central cylindrical body portion of section X, a cylindrical axially rearwardly projecting power input section Y, a forwardly projecting, cylindrical drive section Z, and a drive coupling D projecting forwardly from the section Z.

The several noted sections X, Y and Z are cylindrical and concentric, one relative to the other and are free of angles, corners and/or projections, whereby the device is suitable and safe to be freely rotated, as a whole, in most commonly encountered environments. For example, the structure is such that it can be safely and comfortably rotated within the loose confines of an operator's hand, as is frequently desirable in the regular use of such tools for the purpose of maintaining proper alignment of parts and the like.

The section or portion Y is characterized by a central, axially rearwardly opening polygonal socket 10 adapted to receive the drive shaft 11 of a related power tool (not shown). As illustrated, the section Y is provided with radially inwardly opening recesses or openings 12, communicating with the socket to accommodate spring actuated detent balls 13 carried by the shaft 11 and adapted to releasably retain the shaft in the socket.

In practice, the shaft 11 illustrated can be a part or portion of an adapter to effect connecting the device with an otherwise non-compatible drive tool or means. Still further, in practice the section Y can be made in any desired or suitable special form in order to effect its connection or coupling to some special form or class of drive means, without departing from the spirit of my invention.

The above noted central body section X is cooperatively related with sections Y and Z and with the several other parts and/or sections of the structure which are normally releasably locked together against relative rotation and are releasably under predetermined applied torque and which can be manually released or unlocked for relative rotation to effect adjusting of the output torque of the device, as will hereinafter be described.

The forward section Z can normally be considered an extension of the body portion X. The portion Z can vary in longitudinal extent and houses or accommodates a central longitudinal extending torque shaft S with which the above noted drive coupling D is related or fixed.

The foregoing describes the basic, normally visible, exterior structure of my invention.

Considering the invention, in light of its mechanical attributes and structure, the structure includes the above noted input or drive section Y, a power output drive assembly O and releasable drive means R related to and between the section Y and assembly O.

The power input or drive section Y is characterized by an elongate cylindrical body 20, with front and rear ends, coupling means 21 at the rear end of the body 20 to couple with the drive shaft 11 of a related prime mover, a central, forwardly opening bearing socket 22 entering the front end of the body 20, and a radially outwardly projecting disc-shaped drive plate or flange 24 with a flat, axially forwardly disposed front face 25 at or about the front end of the body and provided with an annular series of circumferentially spaced axially forwardly opening drive ball receiving sockets or detents 26.

The coupling means 21 can vary widely in form and is shown as including the central rearwardly opening polygonal opening in the body 20 in which the shaft 11 of the related prime mover is slidably engaged. The shaft and the means 20, as shown, include the balls 13 and detents 12, hereinabove described, to releasably retain the parts coupled together.

The bearing socket 22 is provided with a radially inwardly opening annular channel 27, the function and purpose of which will hereafter be described.

The power output or drive assembly O includes the aforementioned elongate axially extending, central torque shaft S, the aforementioned coupling D which is fixed to and projects forwardly from the front end of the shaft S, and a driven plate or flange 30, drivingly coupled or connected with and projecting radially outwardly from the rear end of the shaft to occur adjacent to and overlie the front surface 25 of the drive flange 24 on the section Y. The driven plate or flange 30 is provided with an elongate, central tubular hub 31 with front and rear portions projecting forwardly and rearwardly from the driven flange or plate 30. The rear, rearwardly projecting portion of the hub 31 slidably enters the socket 22 of the body 20 in rotary supported engagement therein.

The rear end of the shaft S is shown coupled with the rear portion of the hub 30 in rotary driving engagement therewith by means of a radially extending retaining pin 32, engaged through the hub and through an enlargement 33 on the rear end of the shaft S, which enlargement is snugly engaged in the rear portion of the hub (see FIGS. 4, 9 and 10 of the drawings).

The retaining pin 32 has end portions projecting radially from the hub and into the channel 27 in the body for free relative rotation and in such a manner as to prevent relative axial movement of the shaft and the hub.

The driven flange or plate 30 is characterized by a plurality of circumferentially spaced axially extending through holes or openings 34 which are spaced radially and circumferentially so that each of said openings normally register with related ball sockets 26 in the drive flange 24, when the power input and output assemblies are in normal predetermined relative rotative position.

In practice, the number of openings 34 is less, for example, one-half, the number of sockets 26.

The drive flange and driven plate 24 and 30, while constituting elements of the power input and output means, also constitute parts of the releasable drive means R, related to those means.

The means R, in addition to the noted flange and plate includes drive balls 40 normally engaged in and extending through the openings 34 and into the sockets 26 in the flange 24 and plate 30, to establish rotary driving engagement between said flange and plate.

The diameter of the ball 40 is substantially equal to the diameter and to the combined axial extent of the socket 26 and openings 34, as shown in the drawings.

More particularly, the axial extent of the openings 34 is greater than the radial extent of the balls 40 and the axial extent of the sockets 26 is less than the radial extent of the balls, whereby the balls are less than halfway engaged in the sockets when they are in their rearmost or normal position. With such a relationship, the balls are engaged by their related sides of the openings 34 in the plate 30 about a central radial plane of the balls, for direct transmission of forces circumferentially of the axis of the construction, while the forward peripheral edges of the sockets engage the balls on radial planes spaced rearward of said central radial plane of the balls and where the surfaces of the balls, tangent with the line of contact with the edges of the sockets are on inclined planes relative to the radial planes of the construction and such that circumferentially applied forces between the balls and the flange 24 cause the balls to ride forwardly and circumferentially out of engagement in the sockets.

The balls 40 are normally yieldingly held and retained in the openings 34 and in the sockets 26, as set forth above, by a flat radially disposed keeper plate 41 adjacent to the front side or surface of the driven plate 30. The plate 41 has a central tubular boss 42 rotatably engaged on the forward portion of the hub 31 related to the plate 30 and is provided with a plurality of forwardly opening ball receiving pockets 43 in a circumferential and radial pattern which is similar to but normally circumferentially offset from the pattern of the sockets 26 in the flange 24 and normally circumferentially offset from the openings 34 in the plate 30. The pockets 43 are substantially equal in diametric and axial extent with the sockets 26 in the drive flange 24. With the above relationship of parts, it will be apparent that upon rotation of the plate 41 to register the pockets 42 thereof with the openings 34 and sockets 26 of the construction, the balls 40 are free to shift axially forwardly in the openings 34, from engagement in the sockets 26 and into engagement in the pockets 43 (as shown in FIG. 10 of the drawings), thereby breaking or interrupting rotary driving engagement between the flange 24 and driven plate 30 and permitting free relative rotation between the input section Y and output assembly O of the construction.

The plate 41 is drivingly coupled with the forward end of the torque shaft S by means of a forwardly projecting drive pin 44 carried by the plate and engaged in a rearwardly opening drive slot 45 in the central body section X of the output assembly O.

The forward end of the portion or section Z which forms a part of the output assembly O and projects forwardly from the central body section X, is drivingly coupled with the forward end of the shaft S by means of a coupling pin 46 extending radially through and between registering openings 47 and 48 in the rear portion of the drive member D and the forward end portion of the section Z, as clearly illustrated in FIG. 4 of the drawings. The central body section X and the forward section Z of the assembly O are normally releasably secured one to the other against relative rotation.

With the above structure and relationship of parts, it will be apparent that the plate 41 is driven circumferentially in direct relationship with circumferential deflection of the front end of the torque shaft S and that the driven flange 30 is in fixed rotative position relative to the rear end of the shaft S. As a result of the above, when the shaft S is torsionally deflected by the application of torsional forces therethrough, the keeper plate 41 is rotated relative to the driven plate 30. Upon sufficient deflection of the shaft and relative rotation of the plates, the pockets 43 of the plate 41 are shifted into register with the openings 34 of the plate 30 and the balls 40 being free to shift forwardly, are driven and urged forwardly by the flange 24, out of engagement in the sockets 26 and into engagement in the pockets 43, interrupting or breaking normal driving engagement between the flange 24 and plate 33 and permitting free relative rotation between the input section Y and output assembly O.

The extent of deflection of the beam S is directly related to the magnitude of applied torsional forces. By adjusting or varying the extent of relative circumferential movement between the plates 41 and 30 which is required to effect registration of the openings 34 and pockets 43, the force transmitted through the tool before driving engagement between the section Y and assembly O is interrupted in the manner set forth above, can be effectively adjusted and/or set.

To the above end, the central section X and forward section Z of the assembly O are releasably secured together by a plurality of circumferentially spaced axially extending bolts 50 engaged in axially forwardly openings 51 in the section X and engaged through axially opening circumferentially extending arcuate slots 52 in the section Z. The bolts have heads 53 at their forward ends, which heads are accessible at or from the forward end of the construction.

By releasing or loosening the bolts 50, the sections X and Z can be rotated relative to each other to adjust and set the normal circumferential positioning of the pockets 43 in the plate 41 relative to the openings 34 in the plate 30. Such adjustment of the plate 41 or its pockets is effected by virtue of the connection or coupling of the plate 41 with the section X, by means of the above noted pin 44 and slot 45.

The pin 44 is normally yieldingly urged and held in stopped engagement in one end of the slot 45 by spring means 55 comprising a radially disposed clock spring 56 arranged between the plate 41 and the section X with one end thereof connected with the pin 44 and its other end connected with an anchor pin 57 carried by and projecting rearwardly from the section X. The spring 56 is normally biased to urge the plate 41 in a counter-clockwise direction, as indicated by arrow in FIG. 6 of the drawings and in normal stopped engagement and normal relative position with respect to the section X.

In operation, and upon application, of torsional force in a clockwise direction to the section Y, and delivering of the applied force to a piece of work, through the shaft S and drive member D, the shaft is deflected clockwise and the plate 30 is urged and moves in a clockwise direction relative to the section X (which is rotatably fixed relative to the front end of the shaft) a distance equal or corresponding with the extent to which the shaft is deflected. The plate 41, by virtue of the spring means and circumferential slop or play afforded by the pin 44 and slot 45, remains in its normal rotative position with the section X and the plate 30 rotates or moves relative thereto.

When sufficient torque and deflection of the shaft S occurs, so as to shift the openings 34 into register with the pockets 43, the balls 40 are drivingly urged forwardly in the openings 34 by the flange 24, out of engagement in the sockets 26 and into engagement with the pockets 43, thereby breaking or interrupting drive between the section Y and assembly O and establishing drive between the plates 30 and 41.

At this time in the operation of the construction, the assembly is free wheeling and the flange 24 is rotated relative to the plate 30 by the related prime mover or power tool. As the above takes place, the shaft S relaxes or becomes unbiased. As the shaft relaxes, the plate 30 returns to its normal rotative position relative to the section X and drives the plate 41 counter-clockwise relative to the section X a distance equal to the normal circumferential offset of the openings 34 and pockets 43. During such relative movement of the parts, the pin 44 shifts circumferentially in the slot 45 in the section X and bias on the spring 56 is increased. The force of the spring 56 is transmitted to the balls 40 to normally yieldingly urge the balls rearwardly in the openings 34 and toward the rotating flange 24 of the section Y.

Upon operation of the structure to the extent noted above, the prime mover is turned off and the section Y is permitted to slow and/or stop. As the assembly slows, it reaches a speed and/or rotative position where the force of the spring 56 acting to urge the balls rearwardly is sufficient to urge and move the balls 40 rearwardly into related sockets 26 of the section Y as those sockets move into register with the openings 34. When this function takes place or occurs, the structure returns to its normal position and is reset for recycling.

In practice, it is preferred that the strength of the spring 56 be rather little and that the extent to which it is biased be small so that it does not tend to urge and move the balls 40 rearwardly and back into engagement in the sockets 26 of the section Y prematurely or so that it does not tend to urge the balls rearwardly into interferring engagement between the section Y and plate 30 as they rotate relative to each other, with such force as would likely cause damage to the structure and/or result in generating undesirable impact forces through the structure.

In practice, and as shown in the drawings, the section Z of the assembly O is provided with an enlarged flange-like rear portion in which the slots 52 are established and which is provided with a forwardly opening annular channel 70 to accommodate and house the heads 53 of the bolts 50. In practice, an annular closure ring 71 is arranged in the channel 70 to close the slots 52 and which is provided with apertures to accommodate the shanks of the bolts 50, as clearly shown in FIGS. 3 and 4 of the drawings. The section Z is also provided with an annular rearwardly projecting skirt 72 about its outer peripheral portion, which skirt is slidably and rotatably engaged about a forwardly and radially outwardly opening cylindrical recess or relief 73 established in the outer forward portion of section X. The section X of the assembly O is provided with an annular rearwardly projecting skirt 74 about its outer rear portion, which skirt extends freely rearwardly and about the outer peripheries of the plates 41, 30 and the flange portion 24 of the section Y, to maintain related parts concentric or in alignment with each other and to shroud or protect and to obscure the said plates and flange.

In practice, and as indicated at 80 in FIG. 1 of the drawings, the section X and the skirt 72 of the section Z are provided with related calibrations for determining and/or effecting the adjustment and setting of the relative rotative position of the sections X and Z and the resulting normal circumferential offset of the pockets 43 in the plate 41 and openings 34 in the plate 30. As noted in the preceding, such adjustment and setting of the offset of the pockets 43 and openings 34 determines the extent to which the shaft S must be deflected to effect the release of driving engagement between the section Y and plate 30 and therefore the magnitude of the torsional force that the structure can and will, at one setting, deliver to a piece of work.

Having described only one typical preferred form and application of my invention, I do not wish to be limited to the specific details herein set forth, but wish to reserve to myself any modifications and/or variations that may appear to those skilled in the art and which fall within the scope of the following claims.

Having described my invention, I claim:

1. An elongate torque limiting device with front and rear ends and engageable with and between a rotating power shaft and piece of work to be torqued and including a rotatable drive section with a rear portion connected with the power shaft and a front portion with a plurality of circumferentially spaced forwardly opening ball receiving sockets in radial outward spaced relationship from the central longitudinal axis of the device, a driven plate forward of the front portion of the drive section and having axially extending through openings normally registered with said sockets, drive balls normally engaged in and extending between the said openings and sockets and establishing driving engagement between the drive section and driven plate, an elongate central torque shaft with a rear end coupled with the driven plate and a front end connected with a work engaging drive member, a keeper plate forward of the driven plate normally overlying the said openings and holding the balls engaged in said openings and sockets and having rearwardly opening pockets normally circumferentially offset from said openings, a body section forward of the keeper plate, means connecting the body section in predetermined rotative position relative to the front end of the torque shaft, spring means normally yieldingly maintaining the keeper plate in a normal rotative position relative to the body section, said pockets being circumferentially offset from said openings a distance equal to the circumferential deflection of the torque shaft between its front and rear ends upon the conducting of predetermined torque therethrough, said drive section urging the balls forwardly from within the sockets and into the pockets when the pockets move into register with the openings whereby drive between the drive section and driven plate is broken and drive between the driven plate and keeper plate is established, said spring means and keeper plate yieldingly urge the balls rearwardly from within the pockets and into said sockets when the balls are engaged in said sockets and said openings register with the sockets, said connecting means includes a front section drivingly coupled with the torque shaft and engaged with the body section for rotation relative thereto and releasable means securing the body and front section against relative rotation with said pockets in normal predetermined circumferential spaced relationship relative to said openings.

2. The device set forth in claim 1 including coupling means coupling the rear end of the torque shaft and the drive section for free relative rotation and against relative axial shifting.

3. The device set forth in claim 2 including bearing means rotatably supporting the drive section, driven plate, keeper plate, body section and front section concentric with each other and with the torque shaft and drive member.

4. The device set forth in claim 1 including bearing means rotatably supporting the drive section, driven plate, keeper plate, body section and front section concentric with each other and with the torque shaft and drive member.

5. The device set forth in claim 1 wherein said spring means comprises a drive pin projecting from the keeper plate in radial spaced relationship from the axis of the device and into stopped driving engagement in one end of a circumferentially extending slot in the body section, an elongate spring with one end connected with said drive pin and its other end connected with the body section and normally yieldingly urging the drive pin toward said one end of the slot.

6. The device set forth in claim 2 wherein said spring means comprises a drive pin projecting from the keeper plate in radial spaced relationship from the axis of the device and into stopped driving engagement in one end of a circumferentially extending slot in the body section, an elongate spring with one end connected with said drive pin and its other end connected with the body section and normally yieldingly urging the drive pin toward said one end of the slot.

7. The device set forth in claim 6 including bearing means rotatably supporting the drive section, driven plate, keeper plate, body section and front section concentric with each other and with the torque shaft and drive member.

* * * * *